United States Patent
Lotspiech

(10) Patent No.: US 9,621,345 B2
(45) Date of Patent: *Apr. 11, 2017

(54) COUNTERING SERVER-BASED ATTACKS ON ENCRYPTED CONTENT

(71) Applicant: INTERNATIONAL BUSINESS MACHINES CORPORATION, Armonk, NY (US)

(72) Inventor: Jeffrey B. Lotspiech, Henderson, NV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,468

(22) Filed: Feb. 2, 2016

(65) Prior Publication Data

US 2016/0164675 A1 Jun. 9, 2016

Related U.S. Application Data

(63) Continuation of application No. 14/176,515, filed on Feb. 10, 2014.

(51) Int. Cl.
*H04L 9/14* (2006.01)
*G09C 1/00* (2006.01)
(Continued)

(52) U.S. Cl.
CPC .................. *H04L 9/14* (2013.01); *G09C 1/00* (2013.01); *H04L 9/002* (2013.01); *H04L 9/0822* (2013.01); *H04L 2209/606* (2013.01)

(58) Field of Classification Search
CPC ....... H04L 9/002; H04L 9/0618; H04L 9/065; H04L 9/0656; H04L 9/0816; H04L 9/0861;
(Continued)

(56) References Cited

U.S. PATENT DOCUMENTS 7,386,126 B2 6/2008 Nakano
7,542,568 B2 6/2009 Ohmori
(Continued)

FOREIGN PATENT DOCUMENTS

WO 2014154291 A1 10/2014

OTHER PUBLICATIONS

Mir Mohammad Azad et al. "Digital Rights Management." (Nov. 2010) IJCSNS International Journal of Computer Science and Network Security, vol. 10, No. 11, p. 24-33.
(Continued)

*Primary Examiner* — Eric W Shepperd
(74) *Attorney, Agent, or Firm* — Erik Huestis; Stephen Kenny; Foley Hoag LLP

(57) ABSTRACT

Embodiments of the present invention relate to providing encrypted content to authorized content consumers while providing robust traitor tracing. In some embodiments, at least one device key is read. A key block is read. A media key precursor is determined from the key block and the at least one device key. At least one encrypted block key is read. A block master key is determined from the media key precursor. A security program is executed to determine a decrypted block key from the media key precursor, the block master key, and the encrypted block key. The decrypted block key is provided for application to the encrypted content to obtain decrypted content.

20 Claims, 5 Drawing Sheets

(51) Int. Cl.
*H04L 9/08* (2006.01)
*H04L 9/00* (2006.01)

(58) Field of Classification Search
CPC ......... H04L 9/088; H04L 9/0891; H04L 9/14; H04L 9/18; H04L 2209/24; H04L 2209/60; H04L 2209/606; G06F 21/10; G06F 21/121; G06F 21/16; G06F 21/30; G06F 21/44; G06F 21/60; G06F 21/62; G06F 21/78; G06F 21/80; G06F 21/88
See application file for complete search history.

(56) References Cited

U.S. PATENT DOCUMENTS

| | | |
|---|---|---|
| 8,023,653 B2 | 9/2011 | Doherty |
| 8,345,876 B1 | 1/2013 | Sinn |
| 8,422,684 B2 | 4/2013 | Jin |
| 8,621,196 B2 | 12/2013 | Pasam |
| 8,806,659 B1 | 8/2014 | Miazzo |
| 2003/0016826 A1 | 1/2003 | Asano |
| 2003/0051151 A1* | 3/2003 | Asano .............. G11B 20/00086 713/193 |
| 2006/0143480 A1 | 6/2006 | Suh |
| 2008/0069353 A1 | 3/2008 | Lotspiech |
| 2008/0295174 A1 | 11/2008 | Fahmy |
| 2009/0214031 A1 | 8/2009 | Jin |
| 2009/0319807 A1 | 12/2009 | Chasen et al. |
| 2010/0043081 A1 | 2/2010 | Kiayias |
| 2010/0169663 A1 | 7/2010 | Lin |
| 2011/0255690 A1 | 10/2011 | Kocher |
| 2012/0057707 A1 | 3/2012 | Fang |
| 2012/0284534 A1 | 11/2012 | Yang |
| 2014/0229731 A1 | 8/2014 | O'Hare |

OTHER PUBLICATIONS

Kevin Henry et al. "An Overview of the Advanced Access Content System (AACS)." David R. Cheriton School of Computer Science, University of Waterloo, ON, Canada, p. 1-24.

* cited by examiner

COUNTERING SERVER-BASED ATTACKS ON ENCRYPTED CONTENT

BACKGROUND

Embodiments of the present invention relate to countering server-based attacks on encrypted content, and more specifically, to providing encrypted content to authorized content consumers while providing robust traitor tracing.

BRIEF SUMMARY

According to one embodiment of the present invention, a method of and computer program product for providing encrypted content to authorized content consumers are provided. At least one device key is read. A key block is read. A media key precursor is determined from the key block and the at least one device key. At least one encrypted block key is read. A block master key is determined from the media key precursor. The security program is executed to determine a decrypted block key from the media key precursor, the block master key, and the encrypted block key. The decrypted block key is provided for application to the encrypted content to obtain decrypted content.

DETAILED DESCRIPTION

Figure 1:
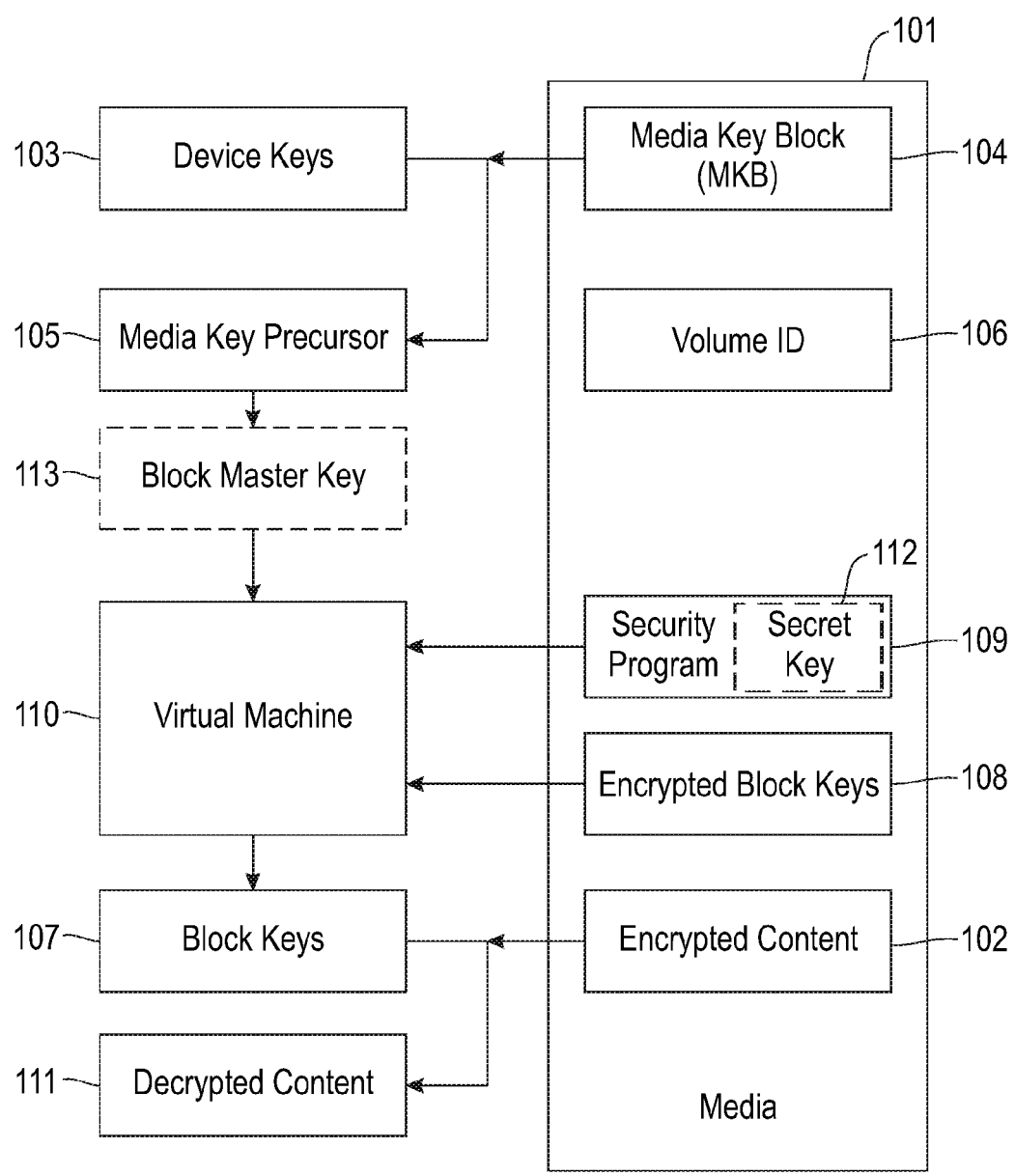
FIG. 1 depicts a method of distributing encrypted content according to embodiments of the present disclosure.

Various optical media are used for the distribution of digital media. Among these are Compact Disc (CD), DVD, Blu-ray, and HD DVD. Higher capacity media such as Blu-ray may be used to distribute high definition media such as movies. Blu-ray discs are beginning to replace DVDs as the dominant medium for distribution of both new movies and back catalogue releases. Blu-ray discs may be protected against unauthorized copying by a broadcast encryption scheme such as the Advanced Access Content System (AACS), established by the Advanced Access Content System Licensing Administrator (AACS LA).

In a broadcast encryption scheme such as AACS, content is encrypted by a title specific cryptographic key. The encrypted content is distributed with an encrypted copy of the title key, a volume ID, and a media key block. An authorized player is in possession of one or more device keys, which may be used to extract a processing key from the media key block. The processing key may then be used in combination with the volume ID to extract the encrypted title key. The title key may then be used to decrypt the encrypted content. In AACS, the device keys and the media key block are determined by a subset difference tree system. However, alternative broadcast encryption schemes are known in the art, such as those adopted by CPRM/CPPM.

As an additional layer of protection for encrypted content, a security program may be included with the content at the time of distribution. The security program is run by the content consumer in order to complete decryption of the encrypted content. Such security programs may examine the environment of the content consumer to determine whether a consuming device has been tampered with, or otherwise verify that the content consumer is in fact authorized. Running the security program may be necessary to transform the content into a consumable form.

A Blu-ray player may include a BD+ virtual machine capable of running a program included on a Blu-ray disc. BD+ is further described in a confidential specification, which is said to be based on "Self-Protected Digital Content" by Kocher, et al. A Blu-ray player may also include a Java virtual machine capable of running a Java program included on a Blu-ray disc. A Blu-ray player may use BD+ for executing a security program while using the Java virtual machine for executing a Java program providing a user interface. However, the Java virtual machine may also be used to execute a security program. In some embodiments of the present disclosure, a combined security program is provided that both enables decryption of the protected content and provides a user interface to that content.

One goal of broadcast encryption schemes such as AACS is to prevent unauthorized copying of encrypted content. If a content consumer is able to make a complete decrypted copy of encrypted content, then they would be able to make unlimited unauthorized copies and redistribute those copies. In AACS, a compromised device key may be revoked for subsequent content releases, thereby limiting the prospective damage of a compromised key. In order to determine which device keys have been compromised, traitor tracing techniques may be employed. In AACS, various forensic techniques may be employed to determine which device keys were used to decrypt that content. Device keys used to decrypt unauthorized copies may then be revoked.

Techniques for traitor tracing include sequence keys and unified media key blocks, both adopted by AACS. To support these techniques, media content must be authored with multiple variations. Each variation corresponds to a given set of device keys. Therefore, by analyzing an unauthorized copy of content, it may be determined which device keys were used to decrypt the content. However, it is more expensive to author content with multiple variations. Thus, authoring of multiple variations has not been widely adopted, severely limiting the utility of such methods. Further description of broadcast encryption and traitor tracing is provided in U.S. Pub. Nos. 2009/0214031 and 2009/0214029.

As further described herein, an alternative forensic technique is soft key conversion data (soft KCDs). In this approach, a player does not have access to the correct media key until a security program is executed. Instead, it has access to a media key precursor. In order to determine the correct transformation, it must provide to the security program information indicative of which media key precursor it has, which in turn reveals which set of device keys is being used by the player at play time. An unauthorized player or copying tool that runs the security program would reveal the device keys in use, which could then be revoked. However, in the case of a simple security program, an unauthorized player could run the security program in a sandbox in order to avoid actual disclosure of compromised device keys.

In order to avoid determination of the device keys used to create an unauthorized copy of content, an unauthorized player or decryption tool may maintain compromised device keys on a server remote from the player or decryption tool. An unauthorized player or decryption tool may then be provided only with individual title keys rather than device keys. These title keys cannot be revoked, as the content encrypted by the title keys is fixed on the distribution medium.

The present disclosure provides methods and systems for forcing a player or copying device to run a security program. By forcing the security program to be run in the player or copying device, compromised device keys may be revealed even where resident on a remote server.

Referring to FIG. 1, in some embodiments of the present disclosure, distribution media 101 includes encrypted content 102. An authorized content consumer, such as a media player, contains device keys 103. The content consumer processes a media key block (MKB) 104 from the distribution media 101 using its device keys 103. In some embodiments, such as those that implement AACS, the MKB 104 is determined by a subset-difference tree approach (NNL). Processing MKB 104 yields at least one media key precursor 105.

In some embodiments, media key precursor 105 comprises the media key and is combined with volume ID 106 to determine a media unique key. The media unique key is then used to decrypt one or more CPS (Content Protection System) unit keys from media 101. A separate CPS unit key may be applicable to different portions of the encrypted content, for example the feature and bonus material. For each 6 KB block of encrypted video on the disc, the player obtains a block decryption key by running the CPS unit key through a one-way function with a seed comprising the first 128 bits of the block. On Blu-ray discs, the 6 KB blocks are called "aligned units".

In some embodiments of the present disclosure, block keys 107 may be derived without the use of a CPS unit key. Instead, block keys are included in encrypted form 108 on the distribution media 101 (e.g., a Blu-ray Disc). A security program 109 is read from media 101 and is run by a virtual machine 110 to decrypt encrypted block keys 108. In some embodiments, encrypted block keys 108 may be contained in a BLOCKKEYS.BIN in the AACS directory on the distribution media 101. The block keys 107 may be used to derive decrypted content 111 from encrypted content 102.

In some embodiments, security program 109 may determine block keys 107 based on the encrypted block keys 108 and a wired-in key (for example, secret key 112 included in security program 109). However, if block keys 107 may be determined without any additional secret, then an unauthorized player or copying device could access encrypted content 102 simply by running security program 109, and could not be revoked. Thus, in some embodiments, an additional secret is used to decrypt the block keys. In some embodiments, the media key precursor 105 is used as the additional secret by security program 109 running on virtual machine 110 to determine block keys 107. In other embodiments, the content consumer determines a block master key 113 from the media key precursor 105, and security program 109 uses the block master key 113 as the additional secret. By making the media key precursor 105 part of the calculation, revocation is possible, because the media key precursor 105 can only be calculated using revocable device keys 103.

Figure 2:
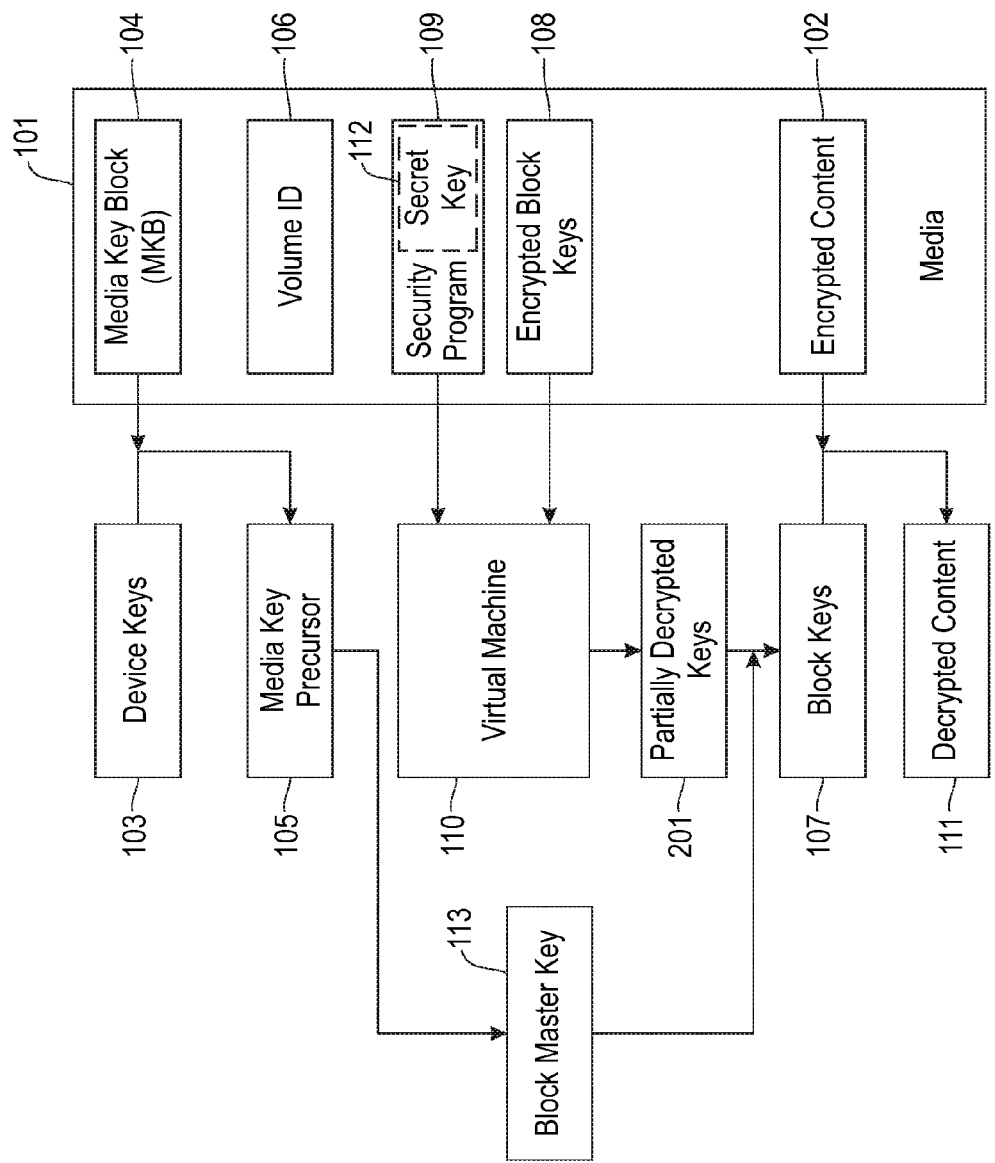
FIG. 2 depicts a method of providing encrypted content according to embodiments of the present disclosure.

As depicted in FIG. 2, in some embodiments, block keys 107 are decrypted in two phases. In a first phase, security program 109 applies a wired-in key 112 to encrypted block keys 108 to yield partially decrypted keys 201. In a second phase, the content consumer determines block master key 113 from the media key precursor 105, and applies it to the partially decrypted keys 201 to yield block keys 107. In some embodiments, each decryption phase uses a different cipher, increasing the reverse engineering challenge for an attacker.

A typical movie contains about 96-100 MB of block keys (128-bit key for each 6 KB block on the disc). Thus, if the security program were run remote from the content consumer, such as on a server, the server would need to send 100 MB of block keys to the content consumer per movie. Sending this data would incur bandwidth costs above those incurred by a system that merely sends a media key. To minimize bandwidth costs, it would therefore be advantageous for an unauthorized player or copying device to run the security program itself rather than rely on a remote system such as a server. This would in turn allow the soft KCD approach to be applied to determine leaked device keys.

In addition to the bandwidth constraints that make distribution of the block keys for each movie undesirable, non-technical factors make distribution undesirable. For example, an unauthorized player or copying device would require a connection to a remote server as part of the decryption process. This would expose the activities of a user to both the remote server, and potentially to third party observers. In the case where unauthorized playing, copying or decryption of encrypted content is illegal, a connection to a remote server increases the potential that the unauthorized user will be caught. In addition, the large ongoing transfers of 100 MB per user per movie would simplify the detection of a server facilitating unauthorized access to content.

Figure 3:
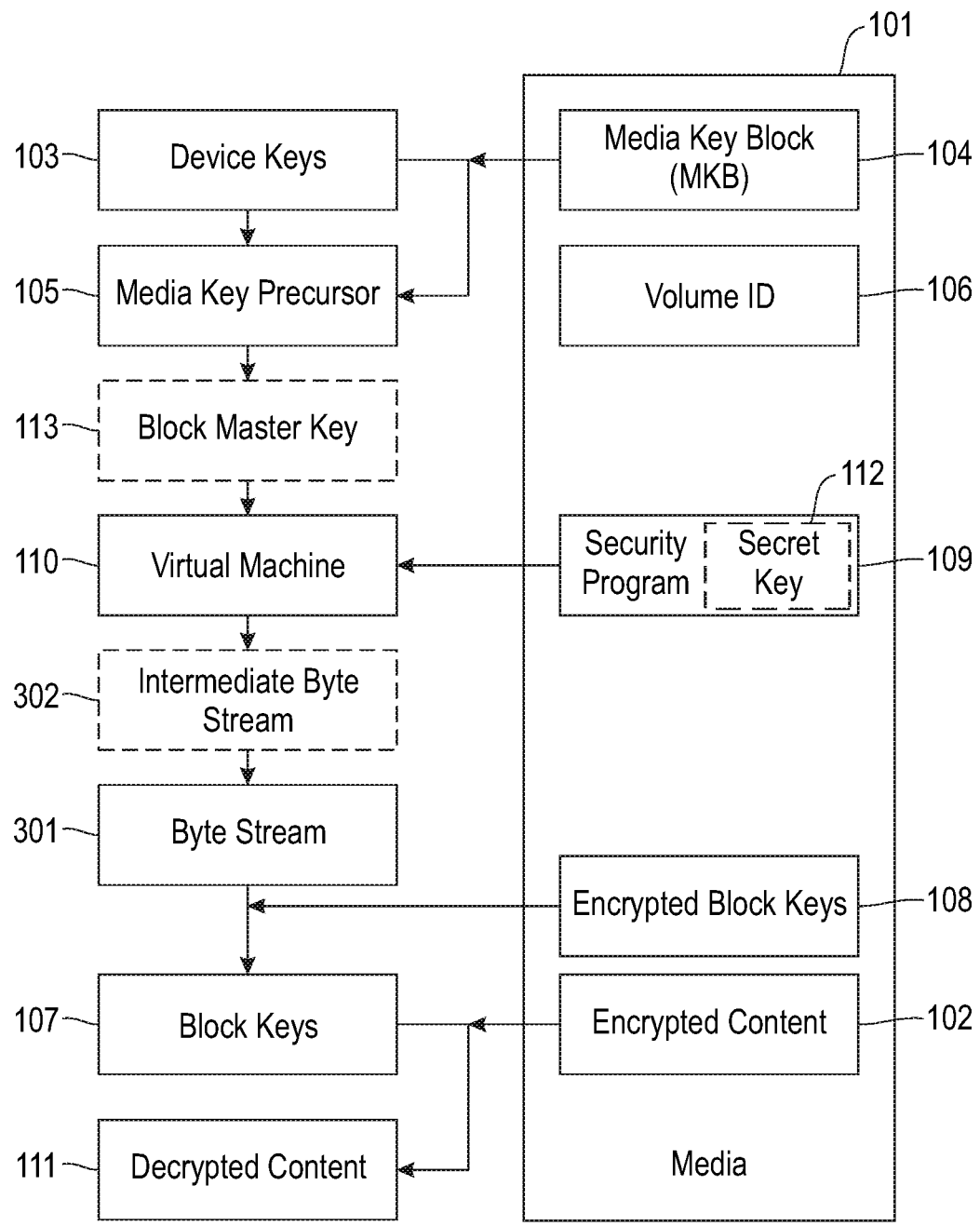
FIG. 3 depicts a method of decrypting content using a stream cipher according to embodiments of the present disclosure.

In some embodiments, as depicted in FIG. 3, an additional decryption step is performed with a stream cipher. In such embodiments, the content consumer does not know the additional secret key. Instead, security program 109 uses secret key 112 and a stream cipher to provide pseudorandom bytes 301 on demand to the content consumer. The bytes 301 are combined with the encrypted block keys 108 using a known function to determine the decrypted block keys 107. The output of the stream cipher is of equivalent length to the data being decrypted. In some embodiments, the known function is xor. To provide the entirety of the output of the stream cipher would require equivalent space to providing the block keys themselves (on the order of 100 MB). If an unauthorized player relies on a the security program being run at a remote location such as on a server, the results of the stream cipher must still be transmitted to the player. Thus, the bandwidth and other disadvantages of remote operation are comparable to the case in which block keys are transmitted to the player.

A variety of stream ciphers are known in the art. Known stream ciphers include A5/1, A5/2, Achterbahn-128/80, CryptMT, FISH, Grain, HC-256, ISAAC, MUGI, PANAMA, Phelix, Pike, Py, Rabbit, RC4, Salsa20, Scream, SEAL, SNOW, SOBER-128, SOSEMANUK, Trivium, Turing, VEST, WAKE. In addition, known techniques may be applied to transform a block cipher into a stream cipher. Known ciphers include AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

In some embodiments, the stream cipher varies according to the distributed content. Introducing even a minor change to the stream cipher for each content item further protects the content. In particular, variations in the stream cipher preclude an unauthorized player from using a reverse engineered key to decrypt more than one content item. Thus, obscure stream ciphers present further advantages, in that the stream cipher key may not be readily reverse engineered.

In some embodiments, the stream cipher is further obfuscated by splitting its application between the security program and the authorized content consumer. In particular, instead of directly outputting byte stream 301, security program 109 outputs intermediate byte stream 302. The content consumer then performs additional calculations to determine the cipher output 301. For example, a stream cipher that applies 16 iterations of a function per output byte may be split among the stream cipher and the authorized content consumer so that the security program performs the first 8 rounds and the player performs the remaining 8 rounds. In some embodiments, the security program applies one type of stream cipher and the player applies a different type of stream cipher, further obfuscating the process.

In some embodiments, the stream cipher bytes may be generated in any order. In such embodiments, it is not necessary to start at the beginning of the 100 MB and process to the end. Instead, cipher bytes may be generated on demand during the playback of the encrypted content according to seek requests supplied by the user.

In some embodiments, the cipher in the security program is tamper-resistant. Various methods for providing tamper-resistant code are known in the art. Application of such methods precludes an unauthorized player from distributing the block master key and then deploying a substitute version of the cipher. In addition, various tamper resistance methods may be applied to the cipher itself. In these circumstances, reverse engineering is of greater concern than cryptanalysis, so use of an obscure cipher rather than a well-studied one may further protect from reverse engineering. Similarly, application of non-standard modifications to the cipher may further obfuscate it and preclude use of standard code in a replacement.

In some embodiments, white box cryptography may be applied to a cipher using a wired in key. In white box cryptography, the key and the S-box tables, which are normally separate, are rolled together to obfuscate both of them.

Figure 4:
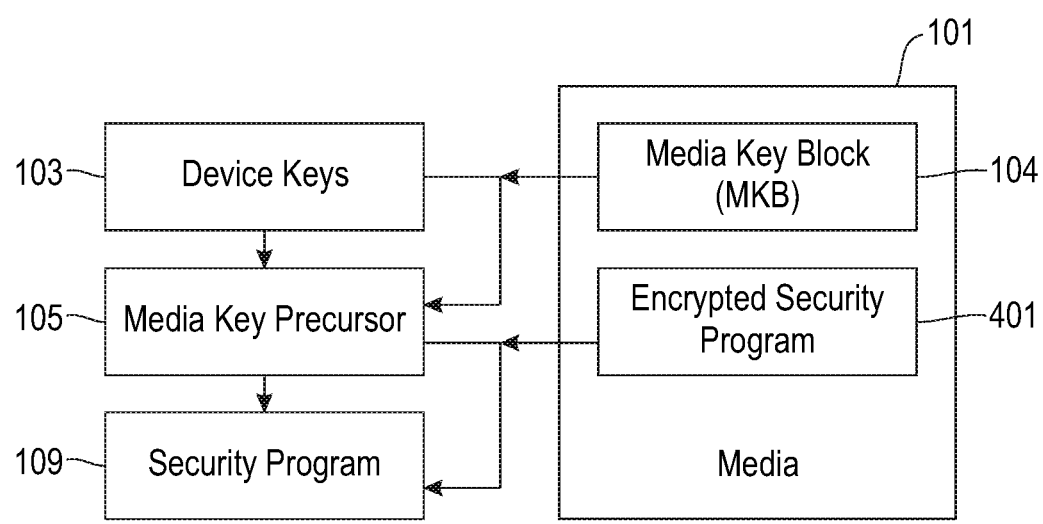
FIG. 4 depicts a method of providing an encrypted security program according to embodiments of the present disclosure.

In some embodiments, as depicted in FIG. 4, some or all of the security program 109 are also encrypted. These encrypted portions 401 may be decrypted using keys derived by an authorized player from the media key precursors 105. Any of the above described security programs may be encrypted in this manner.

The obfuscations discussed above may vary between encrypted media, for example for each movie released. This further reduces the benefit of reverse engineering, and encourages an unauthorized player to run the security program, which allows discovery of compromised device keys.

Separate 100 MB encrypted block keys may be provided for different groups. In some embodiments, each vulnerable manufacturer is assigned a different encrypted block key. This approach enables a different cipher to be applied to each manufacturer, further limiting the impact of reverse engineering techniques. Even if there is only a single 100 MB file with encrypted block keys, the security program may yield data XORed with a constant specific to an individual authorized player manufacturer. The authorized player may then perform the inverse XOR operation to extract the data. The constant used for an XOR operation may be combined into the cipher tables, further limiting the possibility that the constant will be guessed.

Software players that have already been deployed may be updated to accommodate the methods discussed above. The majority of compromised device keys have been those allocated to software players. Therefore, the widespread deployment of the methods disclosed herein would provide significant protection against unauthorized content decryption and players.

Figure 5:
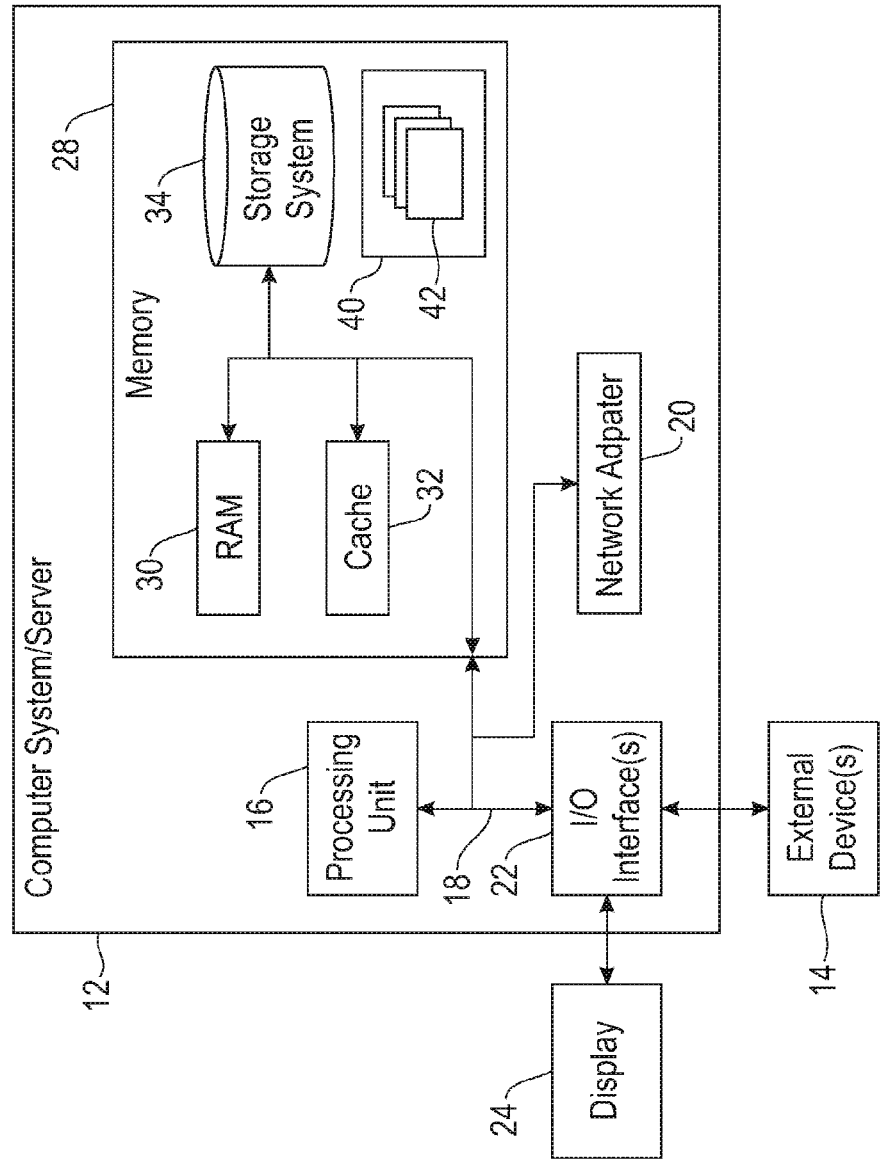
FIG. 5 depicts a computing node according to an embodiment of the present invention.

Referring now to FIG. 5, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   reading at least one device key;
   reading a key block;
   determining a media key precursor from the key block and the at least one device key;
   reading at least one encrypted block key;
   determining a block master key from the media key precursor;
   executing a security program to determine a decrypted block key from the media key precursor, the block master key, and the encrypted block key;
   providing the decrypted block key for application to encrypted content to obtain decrypted content.

2. The method of claim 1, wherein the key block corresponds to a subset-difference tree.

3. The method of claim 2, wherein determining the media key precursor comprises traversing the subset-difference tree.

4. The method of claim 1, wherein the key block, the security program, the at least one encrypted block key, and the encrypted content are encoded in a computer readable medium.

5. The method of claim 4, wherein the computer readable medium is a Blu-ray Disc.

6. The method of claim 1, wherein applying the decrypted block key to the encrypted content is performed by the security program.

7. The method of claim 1, further comprising:
   reading an encrypted security program; and
   applying the media key precursor to the encrypted security program to determine the security program.

8. The method of claim 1, wherein the security program comprises a secret key, and executing the security program further comprises:
   applying the secret key to the encrypted block key.

9. The method of claim 1, wherein determining the block master key from the media key precursor is performed by the security program.

10. The method of claim 1, wherein executing the security program comprises:
    executing the security program in a virtual machine.

11. The method of claim 1, wherein the at least one device key is contained in a key bundle, the key bundle being uniquely associated with an authorized content consumer.

12. The method of claim 1, wherein executing the security program comprises:
    applying the block master key to an output of the security program to determine the decrypted block key.

13. A method comprising:
    reading at least one device key;
    reading a key block;
    determining a media key precursor from the key block and the at least one device key;
    determining a block master key from the media key precursor;
    executing a security program to generate a byte stream from the media key precursor and the block master key;
    reading at least one encrypted block key;
    applying the byte stream to the encrypted block key to determine a decrypted block key;
    providing the decrypted block key for application to encrypted content to obtain decrypted content.

14. The method of claim 13, wherein determining the block master key from the media key precursor is performed by the security program.

15. The method of claim 13, wherein executing the security program comprises:
    generating an intermediate byte stream;
    applying a function to the intermediate byte stream to generate the byte stream.

16. A computer program product for reading encrypted content, the computer program product comprising a non-transitory computer readable storage medium having program code embodied therewith, the program code executable by a processor to:
    read at least one device key;
    read a key block;
    determine a media key precursor from the key block and the at least one device key;
    read at least one encrypted block key;
    determine a block master key from the media key precursor;
    execute a security program to determine a decrypted block key from the media key precursor, the block master key, and the encrypted block key;
    provide the decrypted block key for application to encrypted content to obtain decrypted content.

17. The computer program product of claim 16, wherein the key block corresponds to a subset-difference tree.

18. The computer program product of claim 17, wherein determining the media key precursor comprises traversing the subset-difference tree.

19. The computer program product of claim 16, wherein the security program, the at least one encrypted block key, and the encrypted content are encoded in a computer readable medium.

20. The computer program product of claim 19, wherein the computer readable medium is a Blu-ray Disc.

* * * * *